Patented June 9, 1936

2,043,927

UNITED STATES PATENT OFFICE 2,043,927

WELDING ELECTRODE

Edwin W. Kronbach, Cleveland Heights, Ohio, assignor to Una Welding, Inc., Cleveland, Ohio, a corporation of Delaware No Drawing. Application May 16, 1932,
Serial No. 611,636

22 Claims. (Cl. 219—8)

This invention relates to electric arc welding, and more particularly to an improved welding electrode.

An object of my invention is to provide an improved welding electrode which is capable, under the influence of the electric arc, of producing weld material having improved mechanical and physical characteristics.

A further object of my invention is to provide a welding electrode having improved arc characteristics, that is especially suitable for use in welding light gauge metal.

Another object of my invention is to provide an electrode having a high rate of deposition when melted in the electric arc, whereby welds may be rapidly made.

A further object of my invention is to provide an electrode which may be moved at a high rate of lineal speed along the surface to be welded to form rapidly welded seams of high quality.

A still further object of my invention is to provide an electrode having a plurality of coatings, the inner coating serving to produce a reducing action around the arc, and the outer coating containing material which increases the melting rate of the electrode and improves the arc characteristics without producing large amounts of slag.

Other objects of the invention will be apparent to those skilled in the art from the disclosures herein made.

By my improved invention, I have provided a welding electrode having a coating which is capable of imparting novel and unique welding characteristics to the electrode so that the welding operation may be performed rapidly and a weld metal of high ductility and strength produced. The coating comprises an inner layer capable of providing a reducing atmosphere over the molten weld metal, and an outer layer containing ingredients which increase the melting rate of the base rod. In addition, my improved coating imparts to the resultant weld metal an improved metallurgical structure, such as non-porosity, homogeneity and fineness of grain, and in general, provides welds having improved physical and mechanical properties. My improved coating furthermore imparts to the electrode such characteristics that even when relatively high amperages are employed, the penetration into the metal being welded is relatively low, so that thin gauge metal, such as steel, may be welded with great ease, as well as with rapidity.

The metal which is to form the base rod of the electrode contemplated by this invention is preferably formed predominantly of ordinary carbon steel, although it may contain manganese, nickel or chromium, or a combination of two or more of these metals, ranging from more than incidental impurities up to 20%. When low carbon steel is employed, I prefer to use the standard welding steel containing from 0.13% to 0.18% carbon, although the carbon content may be considerably lower than this range but preferably is not higher than approximately 0.3%. The carbon content is preferably kept low because low carbon steel rods have better welding characteristics than high carbon steel rods. The other impurities of the steel, such as silicon, phosphorus and sulphur, are preferably within the ranges dictated by good welding practice, such as indicated by the standards of the American Welding Society.

The inner layer of the coating to be applied to the steel rod consists essentially of carbon secured to the rod by a suitable binder. The carbon is preferably employed in comminuted form, such as 60 mesh or finer, and may be used in the form of coke flour, lamp black, vegetable carbon, bone black or any other suitable form. Other carbonaceous material, such as cellulose or carbohydrates, may be employed, although I have found carbon to be superior because it oxidizes faster. I prefer to utilize animal or vegetable carbon as they burn better under the arc and do not produce the alloying effect obtained when mineral carbon, such as powdered coke, is employed. Any suitable binder may be employed to attach the carbon to the rod, such as a 50% aqueous solution of sodium silicate or a cellulose lacquer or shellac. I prefer to utilize an aqueous solution of sodium silicate, a sufficient amount of the sodium silicate being present to maintain the carbon firmly in place. The carbon coating may be applied by spraying the rod with a suspension of carbon in an aqueous solution of the binder, by dipping the rod in the suspension, or by extrusion. The coating is applied to the rod so that the carbon will be present in amounts ranging from about .1% to 1% of the weight of the rod. The amount of carbon on the rod should be sufficient to produce an ample quantity of a reducing gas. If too much, or insufficient carbon is utilized, however, a porous weld will be obtained. In certain cases, in order that the carbon may not be present in too large an amount, a fraction only of the surface may be coated. This is especially true when employing coke flour, as in such cases I have sometimes found it desirable to coat only about 40% of the surface of the metal rod.

The outer coating consists of a deoxidizer, which also increases the melting rate of the rod, such as titanium, manganese, silicon or vanadium, their ferrous alloys, or a mixture of two or more of these ingredients, a diluent, such as talc, and calcium carbonate, the materials being secured to the rod by a suitable binder, such as a 30% aqueous solution of sodium silicate or a cellulose lacquer in sufficient amount to maintain the coating in place. As the deoxidizer, I prefer to utilize titanium or ferrotitanium, or a combination of titanium or ferrotitanium with an additional deoxidizer. The titanium not only acts as a deoxidizer, but also aids in increasing the melting rate of the base rod. The titanium may be in any suitable metallic form, such as metallic titanium or ferrotitanium, although for economical reasons I prefer to utilize ferrotitanium containing about 25% titanium, which is comparatively free from carbon or only has a small carbon content, the alloy being employed in comminuted form. The talc and calcium carbonate are also preferably utilized in powdered or comminuted form.

The composition of the outer coating may be widely varied and may consist of titanium or ferrotitanium in powdered form and a diluent, or a combination of titanium or ferrotitanium with another deoxidizer and a diluent, and a suitable binder such as sodium silicate. I prefer to employ talc for this purpose, although other diluents, such as calcium chloride and calcium fluoride, may be utilized. I have found talc to be exceedingly advantageous in that it confers very desirable arc welding characteristics upon the electrode. The talc is preferably employed in comminuted form, such as 100 mesh or finer.

The proportion of talc to titanium may be varied within relatively wide limits. Very small proportions of talc, such as an effective amount appreciably greater than a trace, has proved advantageous. Moreover, talc in large proportions with respect to the titanium has been employed with success. For example, I have utilized the mixture of titanium and talc in the proportion of about 85 parts by weight of talc to 15 parts by weight of a ferrotitanium alloy containing 25% titanium, with good results, and various intermediate mixtures have proven satisfactory. I prefer to utilize an outer coating containing at least a major proportion of talc because it not only reduces the cost of the electrode but permits an even distribution of the titanium or titanium alloy over the surface of the electrode. The talc is preferably present in amounts ranging from 3% to 30% of the weight of the base rod. The titanium or ferrotitanium may be present in the outer coating so that the titanium content will be present in amounts ranging from .05% to an amount not substantially greater than 2% of the weight of the base rod. If other deoxidizers are employed, or the combination of titanium with another deoxidizer is utilized, the total amount of the deoxidizer or deoxidizers is preferably maintained within the range specified. I preferably utilize amounts ranging from .5% to 1% of the weight of the base rod. If the titanium is present in moderate excess, such excess is ordinarily not harmful, but is merely oxidized in the arc, performing insofar as we are aware, no useful function. Titanium in great excess, however, may cause porosity in the weld metal.

The use of calcium carbonate is not essential, and this is especially true if lime is employed as a lubricant in forming the base rod and is present on the surface of the rod in appreciable amounts. I prefer, however, to add a small amount of calcium carbonate in order to increase the stability and penetrative qualities of the arc. The amount of calcium carbonate in the outer coating preferably varies from more than appreciable amounts up to approximately 5% of the weight of the base rod. Because of its penetration properties for light gauge welding, the amount of calcium carbonate should preferably be below .2% of the weight of the base rod.

As a specific illustration, I have found very satisfactory for general welding purposes an outer coating containing a mixture having approximately the following composition:

| | |
|---|---|
| Talc | 73.2% |
| Ferrotitanium (25% titanium) | 24.3% |
| Calcium carbonate | 2.5% |

The ingredients forming the outer coating are mixed with about a 30% aqueous solution of sodium silicate to form a suspension which may be applied to the rod by any suitable means, such as brushing, spraying, dipping, or extrusion. This outer layer is applied to the rod after the first coating layer has dried thoroughly, and usually constitutes from about 5% to 40% by weight of the electrode.

By way of specific example, electrodes have been produced in accordance with this invention employing base rods of low carbon steel of approximately the following analysis:

| | |
|---|---|
| Carbon | 0.13% to 0.18% |
| Manganese | 0.40% to 0.60% |
| Silicon | 0.06% maximum |

A suspension consisting of approximately 6% by weight of lamp black and 94% by weight of a 50% aqueous solution of sodium silicate was prepared and applied to the rod to form the inner coating in such an amount that the carbon content of the coating constituted about .3% of the weight of the base rod. The inner coating was then thoroughly dried.

In forming the outer coating, a mixture of approximately the following composition was prepared:

| | |
|---|---|
| Talc | 73.2% |
| Ferrotitanium (25% titanium) | 24.3% |
| Calcium carbonate | 2.5% |

A sufficient amount of the above mixture was added to a 30% aqueous solution of sodium silicate to form a suspension containing approximately 52% by weight of the mixture. The suspension, thus formed, was applied over the inner coating in a sufficient amount so that the mixture of talc, ferrotitanium and calcium carbonate constituted about 12% of the weight of the base rod.

To illustrate the comparative ductility of the weld metal formed with our improved electrode, butt welds were made between sections of fire box boiler plate in one case with a bare low carbon steel rod, such as the base rod employed in preparing our improved electrode; and, secondly, with an electrode coated in the manner specified. The welds were made employing direct current from a dynamotor as a source of energy. After the welding operation, excess weld metal was ground off to form specimens of uniform section, and the specimens were bent around a steel pin of one inch diameter. The specimen welded with the bare steel electrode failed in the weld after an angle of bend of about 43 degrees, while the specimen formed with our improved coated electrode was bent to an angle of 180 degrees without failure.

To illustrate further the ductility of weld metal made with my improved electrode, a bead was deposited on a steel plate. Two more beads were then superposed upon the first bead by depositing weld metal from my improved electrode, the beads being about ten inches in length. The plate was then bent with the welds on the outside, and no failures occurred therein even when the plate was bent through an angle of 180 degrees. In this test an outer fibre elongation of 66% in one inch of weld took place without failure of any kind. Similar welds deposited with bare steel electrodes failed at a bend of less than 45 degrees.

The tensile strength of weld metal produced by our improved electrode will be apparent by considering the following experiment. Steel bars were butt-welded by means of a coated electrode prepared in the manner specified in this invention, utilizing a low carbon base rod, and the resulting test pieces were machined down to a uniform dimension. Three holes were drilled through the weld metal in each specimen in order to make certain that the fracture would occur in the weld. Similar specimens were prepared employing bare low carbon steel electrodes. The results of the comparative tensile tests are given below:

| Type rod | Elongation of holes | Ultimate tensile strength | Fracture |
|---|---|---|---|
| Bare mild steel | Practically none | 57,000 | Crystalline. |
| Coated electrode | 30 percent | 68,000 | Silky. |

It will be noted that the tensile strength of weld formed by means of my improved electrode was not only about 20% greater than that produced by means of the bare rod, but the ductility shown by the elongation was considerably greater.

In addition, the crystalline appearance of the fracture indicated clearly the superior physical properties of the weld produced by my improved electrode. Microscopic examinations made of welds formed from my improved electrode as compared with welds formed with bare steel electrodes, show that my improved electrode produces weld metal having a considerably finer grain, less porosity, and containing less visible impurities and inclusions.

My improved electrode, moreover, has exceedingly advantageous arc welding characteristics, which make the electrode very useful for many purposes. In the first place, because of the effect of the coating on the core, the metal of the electrode melts very rapidly for any given amperage, thus providing a high deposition rate which renders the electrode particularly useful for high speed welding. Furthermore, during welding the arc is extremely stable. This feature enables the electrode to be advanced at a high linear rate, so that weld seams of greater length may be produced in a given time than when bare rods are employed. The welding arc, moreover, tends to spread out, even when high currents are used, producing relatively low penetration into the metal being welded, thus rendering the electrode suitable for welding light gauge material. For example, when a bare steel electrode having a diameter of 3/32 of an inch is employed to deposit weld metal on 18 gauge steel at a welding current of 50 amperes, holes will be burned through the steel. With my improved electrode, however, under like conditions, burning of the base metal does not take place, and very satisfactory welds can be made.

In welding operations in which my improved electrode is employed, a crater develops at the electrode tip. The carbon from the inner coating apparently forms a carbon dioxide, such as carbon monoxide, within the crater, and produces a reducing atmosphere around the arc. I have found by experiment that carbon applied otherwise than as an inner coating will not produce the same deoxidizing and weld-protecting effect. For example, carbon coatings applied as an outer coating or mixed with the materials forming the outer coating and applied as a single coating, do not give the same quality of weld nor the same quality of arc and metal flow as when an inner coating of carbon and an outer coating of the other ingredients are utilized. I attribute this to the fact that when the carbon coating is on the inside, sufficient air does not come in contact with it to cause complete combustion and carbon monoxide, which has a highly reducing effect, is formed instead of carbon dioxide, the latter compound having more of a neutral effect. Furthermore, by utilizing an inner carbon coating, the reducing gases are concentrated around the electrode where they are the most effective.

The materials composing the outer coating, besides functioning to produce the crater effect, assist in further deoxidizing the weld metal. They also impart highly desirable physical and mechanical characteristics to the weld metal, and increase the melting rate of the electrode at any given welding amperage. The action of the inner carbon coating, moreover, is apparently decarbonizing in effect, rather than carbonizing, as might be expected. Tests which have been made show that the carbon content of the weld metal produced from our electrode is less than the carbon content initially present in the metal core of the electrode.

It will thus be seen that I have provided a welding electrode of highly desirable characteristics for high speed welding and for welding thin gauge material. It will further be noted that my electrode possesses marked advantages as to arc welding characteristics, and produces a weld metal having great solidity, homogeneity, ductility, tensile strength and of marked physical and mechanical properties in general.

To those skilled in the art many modifications of and widely differing embodiments and applications of my invention will suggest themselves, without departing from the spirit and scope thereof. For example, instead of disposing the carbonaceous coating on the outside of the rod it may be placed in grooves or notches on the rod or the surface of the base rod may be heavily carburized, and when the term "inner coating" is employed in the specification and claims, it will be understood that it includes such modifications. My disclosure and the description herein are purely illustrative and are not intended to be in any sense limiting.

What I claim is:

1. A welding electrode, comprising a ferrous base rod, an inner coating comprising a carbonaceous material, and an outer coating comprising titanium in the form of metallic titanium or ferrotitanium having a titanium content ranging from .05% to an amount not substantially in excess of 2% of the weight of the base rod.

2. A welding electrode, comprising a ferrous base rod having an inner coating comprising a thin layer of carbonaceous material, and an outer coating comprising a deoxidizer selected from a group consisting of titanium, manganese, silicon, vanadium or their ferrous alloys in an amount ranging from .05% to not substantially in excess of 2% of the weight of the electrode.

3. A welding electrode, comprising a ferrous base rod having an inner coating comprising carbon in amounts ranging from approximately .1% to 1% of the weight of the base rod and an outer coating comprising titanium in elementary or alloy form in an amount sufficient so that the titanium content will range from .05% to not substantially in excess of 2% of the weight of the base rod.

4. A welding electrode, comprising a low carbon steel base rod having an inner coating comprising carbon in amounts ranging from approximately .1% to 1% of the weight of the base rod and an outer coating comprising titanium in elementary or alloy form in an amount sufficient to provide a titanium content ranging from .05% to an amount not substantially in excess of 2% of the weight of the base rod.

5. A welding electrode, comprising a low carbon steel base rod having an inner coating comprising carbon in amounts ranging from approximately .1% to 1% of the weight of the base rod and an outer coating comprising titanium in elementary or alloy form and an additional deoxidizer, the deoxidizers being present in amounts ranging from .05% to not substantially in excess of 2% of the weight of the base rod.

6. A welding electrode, comprising a ferrous base rod having an inner coating comprising carbon in amounts ranging from .1% to 1% of the weight of the electrode, and an outer coating comprising titanium in elementary or alloy form mixed with a diluent and distributed uniformly over the surface of the rod, the titanium content being present in amounts ranging from .05% to not substantially in excess of 2% of the weight of the base rod and the diluent being present in appreciable amounts up to at least a major proportion of the outer coating.

7. A welding electrode, comprising a ferrous base rod having an inner coating comprising carbon in amounts ranging from .1% to 1% of the weight of the base rod, and an outer coating comprising titanium in elementary or alloy form mixed with talc in proportions ranging from more than appreciable amounts of talc up to at least a major proportion of the outer coating, the titanium content of the outer coating ranging from .05% to not substantially in excess of 2% of the weight of the base rod.

8. A welding electrode, comprising a low carbon steel base rod having an inner coating comprising carbon in amounts ranging from .1% to 1% of the weight of the base rod and an outer coating comprising titanium in elementary or alloy form and an additional deoxidizer, said outer coating having talc associated therewith in proportions ranging from more than appreciable amounts of talc up to at least a major proportion of the outer coating, the total amount of deoxidizer present ranging from .05% up to an amount not substantially in excess of 2% of the weight of the base rod.

9. A welding electrode, comprising a ferrous base rod having an inner coating comprising carbon in amounts ranging from .1% to 1% of the weight of the base rod and an outer coating comprising titanium in elementary or alloy form in amounts ranging from .05% to not substantially in excess of 2% of the weight of the electrode, said outer coating also having a diluent and an arc stabilizer associated therewith, the diluent being present in appreciable amounts up to at least a major proportion of the outer coating and the arc stabilizer being present in amounts ranging from appreciable amounts up to 5% of the weight of the base rod.

10. A welding electrode, comprising a low carbon steel base rod having an inner coating comprising a thin layer of carbonaceous material and an outer layer comprising titanium and an additional deoxidizer in amounts ranging from .05% to not substantially in excess of 2% of the weight of the base rod, said electrode also having talc and calcium carbonate associated therewith, the talc being present in appreciable amounts up to at least a major proportion of the outer coating and the calcium carbonate being present in amounts ranging from appreciable amounts up to 5% of the weight of the base rod.

11. A welding electrode, comprising a low carbon steel rod containing one or more alloying elements selected from a group consisting of nickel, manganese and chromium in proportions ranging from appreciable amounts up to 20%, an inner coating comprising a carbonaceous material in amounts ranging from .1% to 1% of the weight of the base rod and an outer coating comprising a deoxidizer uniformly distributed over the surface of the rod, the deoxidizer being present in amounts ranging from .05% to not substantially exceeding 2% of the weight of the base rod.

12. A welding electrode, comprising a low carbon steel rod containing one or more alloying elements selected from a group consisting of nickel, manganese and chromium in proportions ranging from appreciable amounts up to 20%, an inner coating comprising carbon in amounts ranging from .1% to 1% of the weight of the base rod and an outer coating comprising titanium and talc, the titanium being present in amounts ranging from .05% to not substantially in excess of 2% of the weight of the base rod and the talc being present in amounts ranging from appreciable amounts up to at least a major proportion of the outer coating.

13. A welding electrode comprising a ferrous base rod having two coatings applied thereto, the inner coating comprising a carbonaceous material which burns at substantially the same rate as the base rod melts and produces a reducing atmosphere at the arc, and the outer coating comprising a slag-forming material which burns at such rate that a protective crater is formed at the end of the rod adjacent the arc which restricts the amount of air coming into contact with the burning carbonaceous material.

14. A welding electrode comprising a ferrous base rod having two coatings applied thereto, the inner coating comprising a carbonaceous material containing carbon in amounts ranging from approximately 0.1% to 1% of the weight of the base rod, and which material burns at substantially the same rate as the base rod melts to produce a reducing atmosphere at the arc, and the outer coating comprising a slag-forming material that forms a protective crater at the end of the rod adjacent the arc which restricts the amount of air coming into contact with the burning carbonaceous material.

15. A welding electrode comprising a base rod, an inner coating of only pure carbon and a binder, adapted to form a reducing atmosphere around the arc, and an outer coating superposed upon the inner coating and comprising a deoxidizer.

16. A welding electrode comprising a base rod, an inner coating of carbonaceous material, adapted to form a reducing atmosphere around the arc, and an outer coating superposed upon the inner coating and comprising a deoxidizer such as titanium.

17. A welding electrode comprising a base rod, an inner coating of only pure carbon and a binder, the carbon being adapted to form a reducing atmosphere around the arc, and an outer coating superposed upon the inner coating and comprising a deoxidizer and a diluent.

18. A welding electrode comprising a base rod, an inner coating of carbonaceous material, adapted to form a reducing atmosphere around the arc, and an outer coating superposed upon the inner coating and comprising a deoxidizer and a diluent of talc.

19. A welding electrode comprising a base rod, an inner coating of carbonaceous material, adapted to form a reducing atmosphere around the arc, and an outer coating superposed upon the inner coating and comprising a deoxidizer, a diluent, and a material to stabilize the arc.

20. A welding electrode comprising a base rod, an inner coating consisting substantially only of comminuted carbon and a binder, the carbon being adapted to form a reducing atmosphere around the arc, and an outer coating superposed upon the inner coating and adapted to form a crater.

21. A welding electrode comprising a base rod, an inner coating of carbon adapted to form a reducing atmosphere around the arc, and an outer coating of material adapted to form a crater, and said latter coating also including materials adapted to form alloys in the weld and thereby alter the characteristics of the weld metal.

22. A welding rod comprising a base rod, an inner coating of carbonaceous material adapted to form a reducing atmosphere around the arc, and an outer coating of flux material including talc, and ferrotitanium, and calcium carbonate in such proportions as to form a crater around the arc, and to provide a deoxidizer.

EDWIN W. KRONBACH.

CERTIFICATE OF CORRECTION.

Patent No. 2,043,927.     June 9, 1936.

EDWIN W. KRONBACH.

It is hereby certified that error appears in the printed specification of the above numbered patent requiring correction as follows: Page 3, second column, line 12, for the word "dioxide" read oxide; and that the said Letters Patent should be read with this correction therein that the same may conform to the record of the case in the Patent Office.

Signed and sealed this 1st day of December, A. D. 1936.

(Seal)     Henry Van Arsdale
Acting Commissioner of Patents.

CERTIFICATE OF CORRECTION.

Patent No. 2,043,927. June 9, 1936.

EDWIN W. KRONBACH.

It is hereby certified that error appears in the printed specification of the above numbered patent requiring correction as follows: Page 3, second column, line 12, for the word "dioxide" read oxide; and that the said Letters Patent should be read with this correction therein that the same may conform to the record of the case in the Patent Office.

Signed and sealed this 1st day of December, A. D. 1936.

(Seal)

Henry Van Arsdale
Acting Commissioner of Patents.